(12) United States Patent
Shibata et al.

(10) Patent No.: US 6,419,139 B1
(45) Date of Patent: Jul. 16, 2002

(54) PINCH ROLLER BEARING STRUCTURE FOR MAGNETIC TAPE APPARATUS

(75) Inventors: Atushi Shibata; Tsukasa Shinmi, both of Osaka (JP)

(73) Assignee: Funai Electric Co. Ltd., Osaka (JP)

( * ) Notice: Subject to any disclaimer, the term of this patent is extended or adjusted under 35 U.S.C. 154(b) by 0 days.

(21) Appl. No.: 09/562,840

(22) Filed: May 1, 2000

(30) Foreign Application Priority Data

May 7, 1999 (JP) .......................................... 11-003062

(51) Int. Cl.[7] .............................................. B65M 20/00
(52) U.S. Cl. .................... 226/194; 226/186; 242/346.2; 384/276; 384/295
(58) Field of Search ................................ 226/194, 186; 242/615.2, 346.2; 384/276, 295, 215, 192

(56) References Cited

U.S. PATENT DOCUMENTS

| 4,033,495 | A | * | 7/1977 | Platt | 226/186 |
| 5,506,738 | A | * | 4/1996 | Tamura et al. | 360/132 |
| 5,788,137 | A | * | 8/1998 | Ku | 226/194 |
| 5,803,335 | A | * | 9/1998 | Lee | 226/191 |
| 5,896,240 | A | * | 4/1999 | Yamazaki et al. | 360/90 |

FOREIGN PATENT DOCUMENTS

| JP | 2-49250 | 2/1990 |
| JP | 10-172202 | 6/1998 |
| JP | 10-228692 | 8/1998 |

* cited by examiner

*Primary Examiner*—Donald P. Walsh
*Assistant Examiner*—Joseph Rodriguez
(74) *Attorney, Agent, or Firm*—Lackenbach Siegel Marzullo Aronson & Greenspan

(57) ABSTRACT

A pinch roller is rotatably provided around a roller shaft by way of a bearing member and abutted against a capstan roller by way of a magnetic tape to rotatively drive the capstan roller, thereby causing the magnetic tape to run. The bearing member has a groove portion formed on a longitudinal center portion of an outer periphery thereof so as to form flange portions abutting against an inner periphery of the roller member in both longitudinal sides of the groove portion. The diameter of portions of the inner periphery of the bearing member where oppose to the flange portions are enlarged than the diameter of a portion where opposes to the groove portion.

7 Claims, 5 Drawing Sheets

PINCH ROLLER BEARING STRUCTURE FOR MAGNETIC TAPE APPARATUS

BACKGROUND OF THE INVENTION

The present invention relates to a magnetic tape apparatus in which a bearing interposed between a pinch roller and a roller shaft has been improved.

One example of a related magnetic tape apparatus will be described referring to FIG. 4. A feed reel stand 2 is engaged with a feed reel in the tape cassette 1. A take-up reel stand 3 is engaged with a take-up reel in the tape cassette 1. A movable tape guide post 4 draws out a magnetic tape t from the tape cassette 1 and winds it around a head cylinder 5. Reference numerals 6, 7 and 8 denote an entire erasing head, an audio erasing head and an audio control head, respectively. Reference numerals 9, 10 and 11 denote a stationary tape guide post, a back tension post and a capstan roller, respectively. A pinch roller 12 is rotatably disposed at one end of a supporting arm 14 which is rotatable around a pivotal shaft 13. At the other end of the supporting arm 14 is provided a cam pin 15 which is movably engaged in a cam groove 16a of a rotary cam 16.

In the above described structure, in a recording or a reproducing mode, for example, the magnetic tape t is drawn out from the tape cassette 1 by means of the movable tape guide post 4 and wound around the head cylinder 5 as shown in the drawing. Then, by rotating the rotary cam 16 at a determined angle to swing the supporting arm 14, the pinch roller 12 is pressed against the capstan roller 11 together with the magnetic tape in between to rotatively drive the capstan roller 11 whereby the magnetic tape t is caused to run.

A first related bearing structure for the pinch roller 12 has been disclosed in Japanese Patent Publication No. 10-228692A. In this structure, as shown in FIG. 5, the pinch roller 12 is so provided as to enclose an upper small-diameter portion 18a of a roller shaft 18 which is projectingly provided at one end of the supporting arm 14 by way of a bearing 19. The bearing 19 is formed of a synthetic resin and consists of an inner cylindrical portion 19a, an outer cylindrical portion 19b which are concentrically overlaid leaving a determined space therebetween, and a thin walled connecting portion 19c which interconnects the cylindrical portions 19a and 19b integrally at their middle portions. The pinch roller 12 consists of a cylindrical sleeve 12a formed of metal, and an elastically deformable roller body 12b formed of rubber or the like and attached to an outer peripheral face of the sleeve 12a. In FIG. 5, 21 denotes a washer, and 22 and 23 denote retaining members.

In the above described structure, when the pinch roller 12 is pressed against the capstan roller 11 together with the magnetic tape t in between, an inclination from a paralleled state of an axis O2 of the pinch roller 12 with respect to an axis O1 of the capstan roller 11 is so adapted to be absorbed by a clearance C between the bearing 19 and the roller shaft 18 and also by a so-called automatic centering function through elastic deformation of the bearing 19.

In the above described structure, because the outer peripheral face of the outer cylindrical portion 19b composing the bearing 19 is tightly fitted to an inner face of the sleeve 12a over the entire face, it has been difficult and annoying to insert the bearing 19 into the sleeve 12a.

Moreover, the thin walled connecting portion 19c is pressed inwardly by inserting the bearing 19 into the sleeve 12a, and a bearing bore 20 formed through the inner cylindrical portion 19a is shrunk in diameter at a middle portion of its inner peripheral face, which will change an inner diameter of the bearing bore 20. Therefore, when the pinch roller 12 is engaged with the small-diameter portion 18a of the roller shaft 18 by way of the bearing 19 which has thus changed in the inner diameter, there has been a fear that a large difference may be created in alignment between the axis O2 of the pinch roller 12 and the axis O1 of the capstan roller, and a reliable function of the automatic centering mechanism may not be attained.

A second related art is disclosed in Japanese Patent Publication No. 10-172202A. In this structure, as shown in FIG. 6, the connecting portion 19c is positioned between the lower ends of the inner and the outer cylindrical portions 19a, 19b, and a large-diameter portion 20a is formed at a lower end of the bearing bore 20 so as to face with the connecting portion 19c.

The above described structure has had such an advantage that even though the thin walled connecting portion 19c is pressed inwardly by inserting the bearing 19 into the sleeve 12a and the bearing bore 20 is partially shrunk in diameter at the inner peripheral face thereof, the shrinkage will be absorbed by the large-diameter portion 20a. However, there has been a fear that the connecting portion 19c may be worn out in a relatively short period since a pressing force of the pinch roller 12 is concentrically applied to the connecting portion 19c.

SUMMARY OF THE INVENTION

In view of the above described problems, it is an object of the present invention to provide a magnetic tape apparatus in which a bearing can be easily inserted into a pinch roller, an automatic centering function can be fully exerted, and a life of the bearing can be maintained for a long period.

In order to achieve the above objects, according to the present invention, there is provided a magnetic tape apparatus comprising:
   a capstan roller; and
   a pinch roller for driving a magnetic tape loaded in the magnetic tape apparatus together with the capstan roller, including:
      a tubular roller member, an outer periphery of which is to be abutted against the capstan roller by way of the magnetic tape;
      a tubular bearing member provided inside of the roller shaft, the bearing member made of a resin material, and having a groove portion formed on a longitudinal center portion of an outer periphery thereof so as to form flange portions abutting against an inner periphery of the roller member in both longitudinal sides of the groove portion; and
      a roller shaft provided inside of the bearing member.

According to the above described structure, the outer peripheral face of the bearing member is only partially fitted to the inner face of the roller member. Accordingly, the bearing member can be easily inserted into the roller member with a smaller force. Further, since the pressing force from the roller member is dispersively exerted on a pair of the flange portions, the pressing force will not damage the flange portions, and the life of the bearing can be maintained for a long period.

Preferably, the diameter of portions of the inner periphery of the bearing member where oppose to the flange portions are enlarged than the diameter of a portion where opposes to the groove portion.

According to the above described structure, since only the middle portion of the inner periphery of the bearing member is brought into contact with the roller shaft, and thereby a width of the portion in contact is small, the so-called automatic centering function can be fully exerted.

Preferably, the enlarged portions of the inner periphery of the bearing member are tapered faces formed so as to gradually enlarged outward.

According to the above described structure, the opposite ends of the inner periphery of the bearing member will not interfere with the roller shaft and will not do harm to the automatic centering function, even in case where the pinch roller is inclined to a relatively large extent.

Preferably, a width of each enlarged portion of the inner periphery of the bearing member in the longitudinal direction thereof is wider than a width of each flange portion in the longitudinal direction of the bearing member.

According to the above described structure, when the bearing member is inserted into the roller member, inward pressing forces are exerted on the flange portions and the opposite ends of the inner periphery of the bearing member are partially shrunk in diameter. Since the shrinkage can be absorbed by the large-diameter portions having the larger width, an inner diameter at the middle of the inner periphery of the bearing member will not change. Thus, the alignment of the axis of the roller member which engages with the roller shaft by way of the bearing member with respect to the axis of the capstan roller can be maintained at a high degree, whereby the automatic centering function can be fully exerted.

Preferably, an outer periphery of one end face of the bearing member is tapered.

According to the above described structure, the bearing member can be easily inserted into the roller member by abutting the tapered portion against the inner periphery of the roller member.

Preferably, an identification mark is provided on the other end face of the bearing member.

According to the above described structure, because the direction of the bearing can be surely identified by means of the identification mark, the bearing member can be accurately inserted into the roller member without error.

Preferably, a resin injection hole formed on the other end face of the bearing member serves as the identification mark.

According to the above described structure, the manufacturing cost can be saved as compared with the case wherein the identification mark is separately formed.

DETAILED DESCRIPTION OF THE PREFERRED EMBODIMENTS

Figure 1:
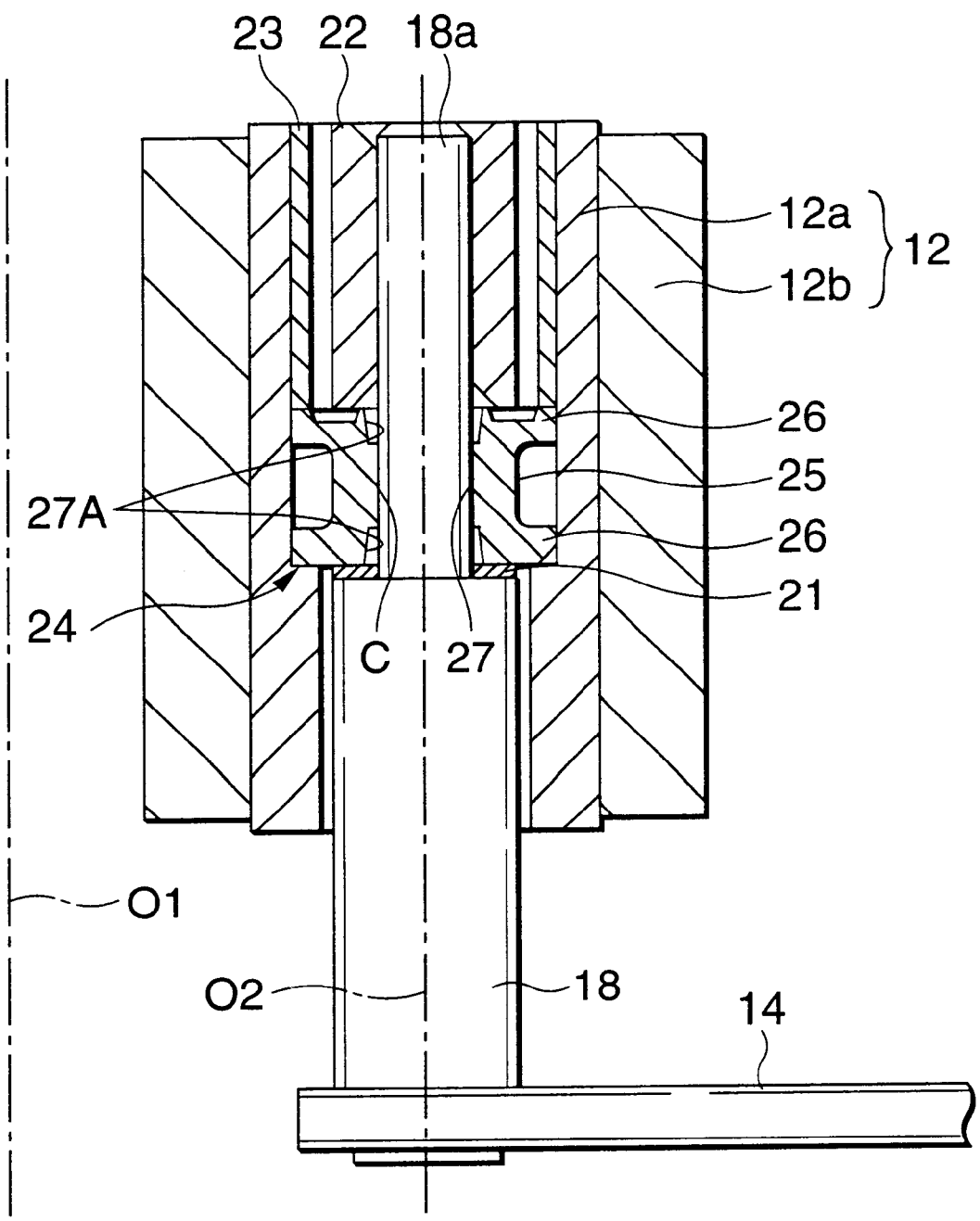
FIG. 1 is a view in a longitudinal section showing a pinch roller bearing structure in a magnetic tape apparatus which is one embodiment according to the invention.
Figure 2:
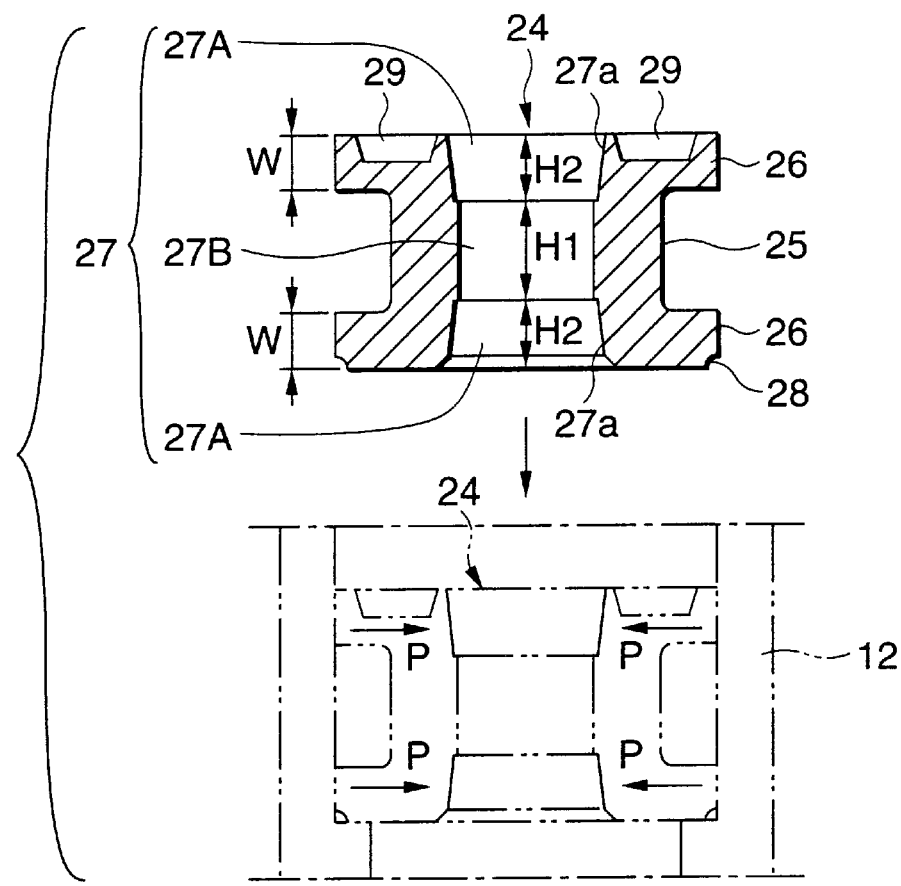
FIG. 2 is an enlarged view of the bearing in a longitudinal section.
Figure 3:
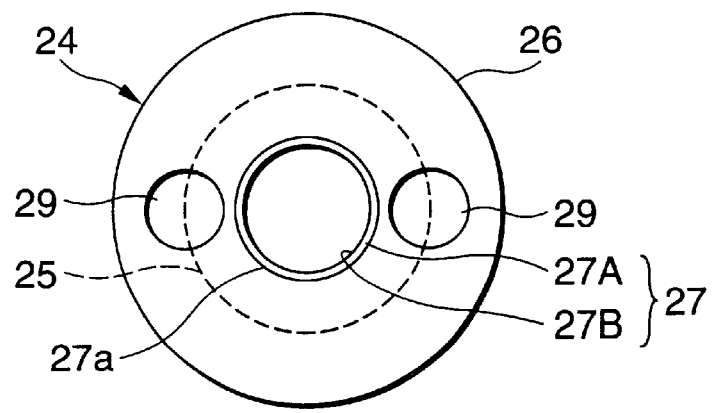
FIG. 3 is an enlarged plan view of the bearing.
Figure 4:
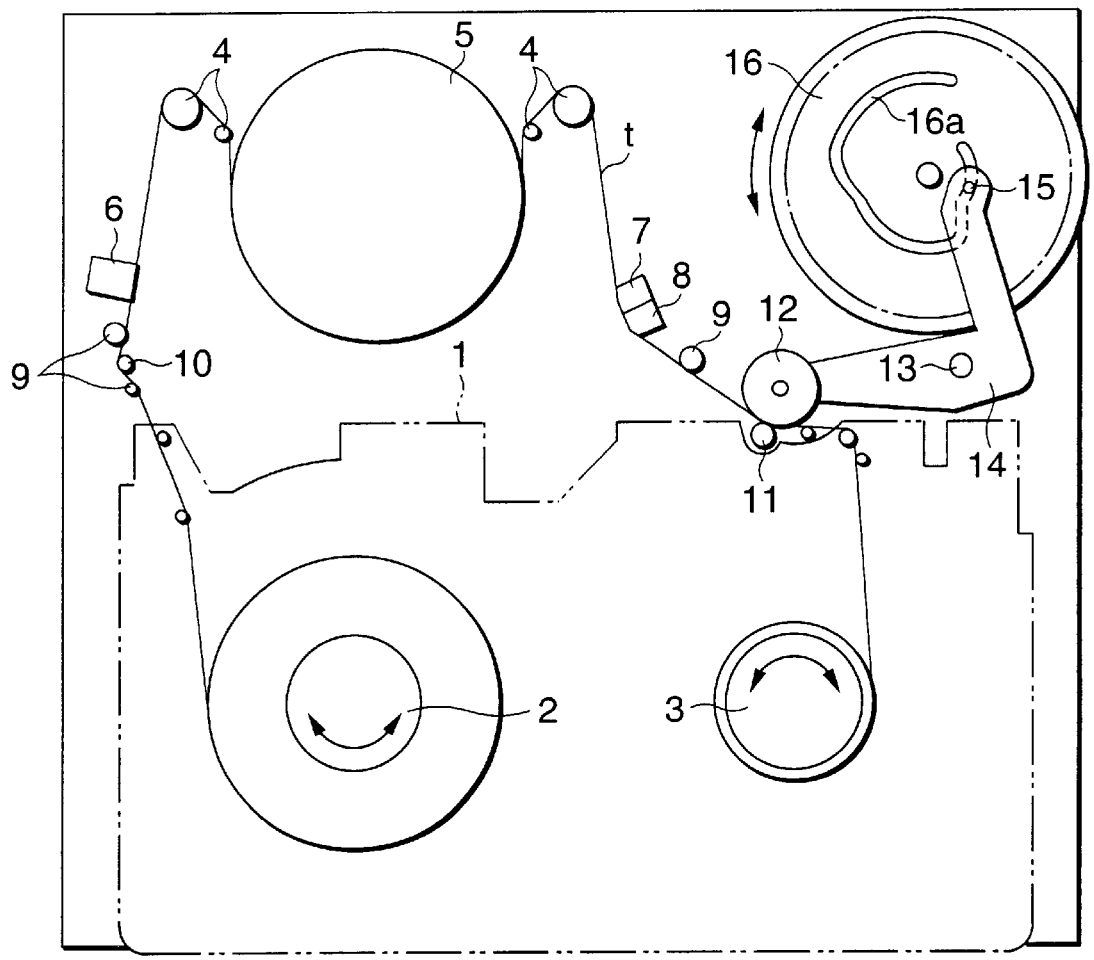
FIG. 4. is a schematic plan view of a prior art magnetic tape apparatus.
Figure 5:
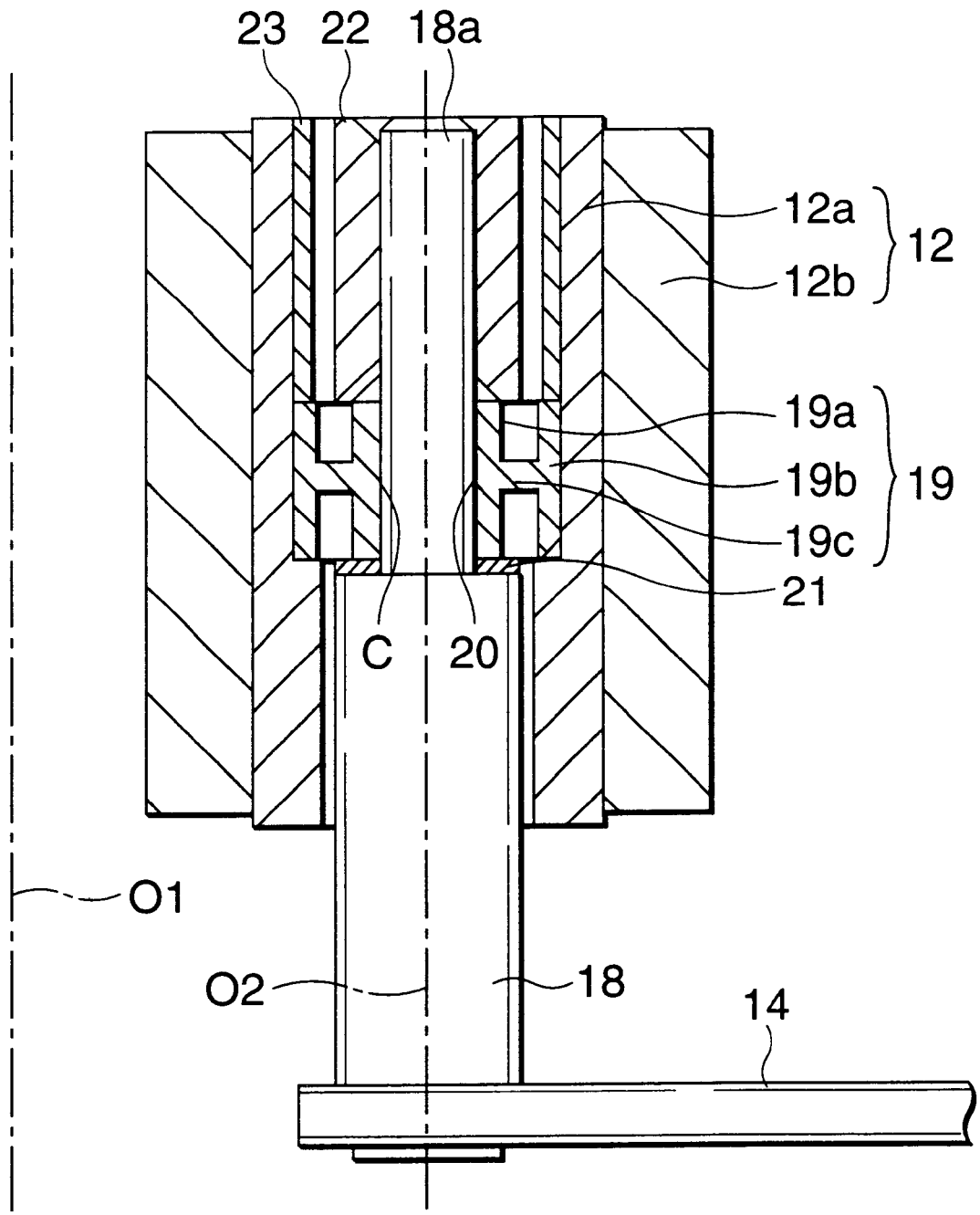
FIG. 5 is an enlarged view, in a longitudinal section, showing another first pinch roller bearing structure related to that of the prior art apparatus.
Figure 6:
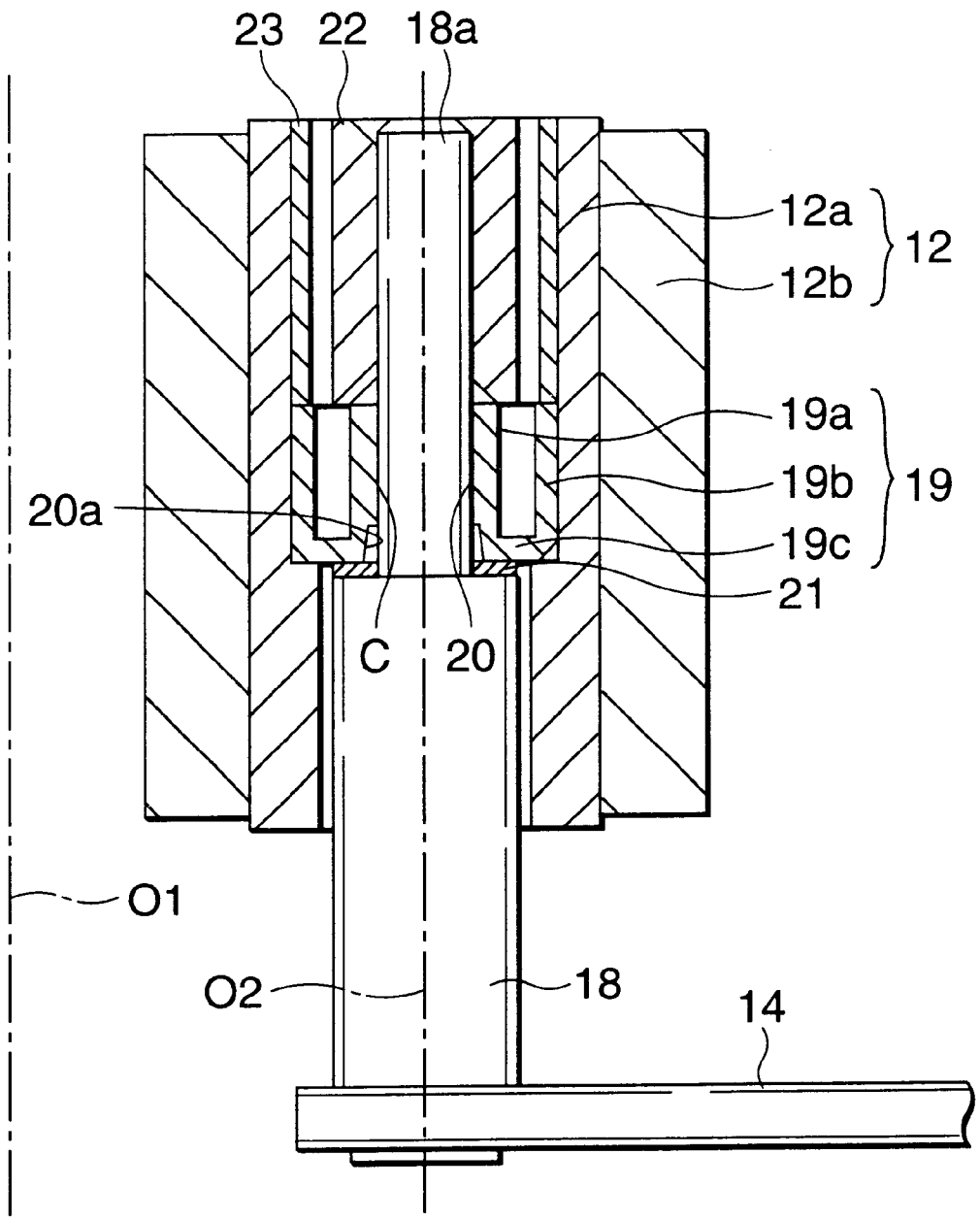
FIG. 6 is a view in a longitudinal section showing a second related prior art pinch roller structure.

Now, one embodiment of the invention will be described referring to the drawings. FIGS. 1 to 3 show a pinch roller bearing structure in a magnetic tape apparatus, which is one embodiment according to the invention. Those components which are the same as in the structure shown in FIGS. 4 to 6 will be denoted with the same reference numerals and their explanation will be omitted. Describing now the different points, a bearing 24 is formed of a synthetic resin material, and an annular groove 25 is formed at the middle of an outer peripheral face of the bearing 24 to form a pair of flange portions 26 at both ends of the outer peripheral face interposing the annular groove 25.

According to the above described structure, the outer peripheral face of the bearing 24 is only partially fitted to the inner face of the sleeve 12a of the pinch roller 12, because the annular groove 25 is formed at the middle of the outer peripheral face of the bearing 24. Accordingly, the bearing 24 can be easily inserted into the sleeve 12a with a smaller force. Further, since the pressing force of the pinch roller 12 is dispersively exerted on a pair of the flange portions 26 which are formed interposing the annular groove 25, the pressing force will not damage the flange portions 26, and the life of the bearing 24 can be maintained for a long period.

As shown in FIG. 2, at opposite ends of an inner peripheral face of a bearing bore 27 which is formed through the bearing 24, are provided large-diameter portions 27A which are larger in diameter than a middle portion of the inner peripheral face. Inner peripheral faces of the large-diameter portions 27A are enlarged outward to form tapered faces 27a. At the middle of the inner peripheral face of the bearing bore 27 is formed a small-diameter portion 27B which has substantially the same diameter as the roller shaft 18.

According to the above described structure, only the small-diameter portion 27B formed at the middle of the inner peripheral face of the bearing bore 27 is brought in contact with the roller shaft 18. Since a width H1 of the portion in contact is small, the so-called automatic centering function can be fully exerted. Further, because the inner peripheral faces of the large-diameter portions 27A are enlarged outward to form the tapered faces 27a, the opposite ends of the inner peripheral face of the bearing bore 27 will not interfere with the roller shaft 18 and will not do harm to the automatic centering function, even in case where the pinch roller 12 is inclined to a relatively large extent.

As shown in FIG. 2, a width H2 of the large-diameter portions 27A is so set as to be rather larger than a width w of the flange portions 26. Therefore, when the bearing 24 is inserted into the sleeve 12a from the condition as shown in a solid line in FIG. 2, inward pressing forces P are exerted on the flange portions 26 and the opposite ends of the inner peripheral face of the bearing bore 27 are partially shrunk in diameter as shown in a phantom line in FIG. 2. Because the shrinkage can be absorbed by the large-diameter portions 27A having the larger width H2, an inner diameter of the small-diameter portion 27B will not change. Thus, the alignment between the axis O2 of the pinch roller 12 which engages with the roller shaft 18 by way of this bearing 24 and the axis O1 of the capstan roller 11 can be maintained at a high degree, and the automatic centering function can be fully exerted.

As shown in FIGS. 2 and 3, an outer circumferential edge of one end face of the bearing 24 is tapered to form a tapered portion 28, and the other end face of the bearing 24 is formed with a resin injection hole 29 into which a resin is injected to serve also as an identification mark.

According to the above described structure, the direction of the bearing 24 can be identified by means of the resin injection hole 29 in order to accurately abut the tapered portion 28 against an edge of an opening in the sleeve 12a. Through the tapered portion 28, the bearing 24 can be easily inserted into the sleeve 12a. Moreover, the recess 29 serves also as the identification mark, and the manufacturing cost can be saved as compared with the case wherein the identification mark is separately formed.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetic tape apparatus comprising:

a capstan roller; and a pinch roller for driving a magnetic tape loaded in the magnetic tape apparatus together with the capstan roller, including;

a tubular roller member, having an inner periphery and an outer periphery which is abutted against the capstan roller by way of the magnetic tape;

a tubular bearing member having an inner periphery and an outer periphery, a longitudinal center portion of the outer periphery being recessed so as to define flange portions abutting against the inner periphery of the roller member at both longitudinal end portions of the bearing member, and so as to form a gap between the inner periphery of the roller member and the outer periphery of the bearing member; and a roller shaft supported by the inner periphery of the bearing member.

2. The magnetic tape apparatus as set forth in claim 1, wherein the diameter of portions of the inner periphery of the bearing member opposed to the flange portions are enlarged relative to the diameter of a portion that opposes the recessed portion.

3. The magnetic tape apparatus as set forth in claim 2, wherein the enlarge portions of the inner periphery of the bearing member are tapered faces formed so as to gradually enlarge radially outwardly.

4. The magnetic tape apparatus as set forth in claim 2, wherein a width of each enlarged portion of the inner periphery of the bearing member in the longitudinal direction thereof is wider than a width of each flange portion in the longitudinal direction of the bearing member.

5. The magnetic tape apparatus as set forth in claim 1, wherein an outer periphery of one end face of the bearing member is tapered.

6. The magnetic tape apparatus as set forth in claim 5, wherein an identification mark is provided on the other end face of the bearing member.

7. The magnetic tape apparatus as set forth in claim 6, wherein a resin injection hole formed on the other end face of the bearing member serves as the identification mark.

\* \* \* \* \*